United States Patent
Kimerling et al.

(10) Patent No.: US 7,239,762 B2
(45) Date of Patent: Jul. 3, 2007

(54) LIGHT MODULATION USING THE FRANZ-KELDYSH EFFECT

(75) Inventors: Lionel C. Kimerling, Concord, MA (US); Kazumi Wada, Lexington, MA (US); Douglas D. Cannon, Somerville, MA (US); Kevin K. Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/277,380

(22) Filed: Oct. 22, 2002

(65) Prior Publication Data

US 2003/0138178 A1 Jul. 24, 2003

Related U.S. Application Data

(60) Provisional application No. 60/330,609, filed on Oct. 22, 2001.

(51) Int. Cl.
*G02F 1/01* (2006.01)
(52) U.S. Cl. .................. 385/1; 385/2; 385/14
(58) Field of Classification Search ............ 385/2, 385/8, 5, 14, 131, 122, 1; 257/103, 79; 372/43–44, 39
See application file for complete search history.

(56) References Cited

U.S. PATENT DOCUMENTS

| | | | | |
|---|---|---|---|---|
| 3,854,795 A | * | 12/1974 | Honda | 359/245 |
| 3,952,265 A | * | 4/1976 | Hunsperger | 372/50 |
| 5,105,240 A | * | 4/1992 | Omura | 257/85 |
| 5,140,651 A | * | 8/1992 | Soref et al. | 358/2 |
| 5,165,105 A | * | 11/1992 | Haase et al. | 385/8 |
| 5,481,630 A | * | 1/1996 | Lawandy | 385/16 |
| 5,557,700 A | * | 9/1996 | Nakamura et al. | 385/122 |
| 5,625,729 A | * | 4/1997 | Brown | 385/31 |
| 5,757,985 A | * | 5/1998 | Ishizaka | 385/2 |
| 5,777,792 A | * | 7/1998 | Okada et al. | 359/584 |
| 6,041,157 A | * | 3/2000 | Goetz | 385/141 |
| 6,052,495 A | * | 4/2000 | Little et al. | 385/2 |
| 6,222,951 B1 | * | 4/2001 | Huang | 385/14 |
| 6,331,445 B1 | * | 12/2001 | Janz et al. | 438/57 |
| 6,522,799 B1 | * | 2/2003 | Bazylenko et al. | 385/14 |
| 6,597,011 B1 | * | 7/2003 | Atanackovic | 257/20 |
| 6,678,296 B1 | * | 1/2004 | Ohfuti | 372/43 |
| 6,812,495 B2 | * | 11/2004 | Wada et al. | 257/79 |

(Continued)

FOREIGN PATENT DOCUMENTS

GB 2221053 1/1990

OTHER PUBLICATIONS

"Franz-Keldysh Effect in the Space-Charge Region of a Germanium p-n Junction," Frova et al. *Physical Review.* Mar. 15, 1965. vol. 137, No. 6A.

(Continued)

*Primary Examiner*—Thien M. Le
*Assistant Examiner*—Edwyn Labaze
(74) *Attorney, Agent, or Firm*—Gauthier & Connors LLP (57) ABSTRACT

An optical modulator includes at least one waveguide medium that receives light. An absorption medium absorbs the light under predefined conditions and outputs optically modulated light. The absorption medium is comprised of a Ge-based structure. The Ge-based structure uses the Franz-Keldysh effect to create said optically modulated light.

18 Claims, 8 Drawing Sheets

U.S. PATENT DOCUMENTS

| | | | |
|---|---|---|---|
| 6,839,491 B2* | 1/2005 | Painter et al. | 385/50 |
| 6,845,198 B2* | 1/2005 | Montgomery et al. | 385/50 |
| 6,978,067 B2* | 12/2005 | Herbert et al. | 385/39 |
| 2003/0039442 A1* | 2/2003 | Bond et al. | 385/37 |
| 2004/0013367 A1* | 1/2004 | Herbert et al. | 385/39 |
| 2005/0017257 A1* | 1/2005 | Green et al. | 257/98 |
| 2006/0124919 A1* | 6/2006 | Harris et al. | 257/19 |

OTHER PUBLICATIONS

"Tunable Absorption Coefficient in GaAs doping Superlattices," Dohler et al. *Physical Review B*. Feb. 15, 1982, vol. 25, No. 4.

"Enhanced Absorption Modulation in hetero *n-i-p-i* structures by constructive superposition of field effect and phase space filling," Gulden et al. *Applied Physics Letters*. Jan. 24, 1994. vol. 64, No. 4.

"Waveguide Modulator Structures with soft optical confinement grown by the epitaxial shadow mask (ESM) MBE-technique," Malzer et al. *Journal of Crystal Growth*. 1997. 175/176.

"High sped and high contrast electro-optical modulators based on *n-i-p-i* doping superlattices," Kiesel et al. *Superlattices and Microstructures*. 1993. vol. 13, No. 1.

* cited by examiner

LIGHT MODULATION USING THE FRANZ-KELDYSH EFFECT

PRIORITY INFORMATION

This application claims priority from provisional application Ser. No. 60/330,609 filed Oct. 22, 2001.

BACKGROUND OF THE INVENTION

The invention relates to the field of optical modulator, and in particular to a method of modulating light in SiGe utilizing the Franz-Keldysh (FK) effect.

The FK effect states that the optical absorption of light in energy near the bandgap can be changed by the presence of an electric field. This effect has been utilized in direct gap systems, such as GaAs, to create electro-optic modulators, because the absorption coefficient changes very rapidly in the vicinity of the band edge. However, because phonons must be involved in absorption in an indirect transition, absorption near the band edge is very weak in indirect semiconductors. Weak absorption makes them poor candidates for optical modulation. For this reason, the FK effect has not been effectively used to create electro-optic modulators in indirect semiconductors, such as Si or Ge.

Although Ge is an indirect semiconductor with a bandgap of approximately 0.68 eV, the direct transition lies at 0.8, which corresponds to 1.55 um light. Ge is highly absorptive at 1.55 μm, so it cannot be used to make a modulator. However, the addition of Si raises the direction transition energy, creating a material with relatively low absorption.

The FK effect has been used in the InGaAs materials system to make linear electro-absorption modulators. However, this effect has not been utilized in any Si-compatible materials system to make electro-optic modulators. Furthermore, the FK effect has not been used before in any system to make modulators utilizing a resonant structure or interference effect. Both of these applications are described in this invention.

SUMMARY OF THE INVENTION

According to one aspect of the invention, there is provided an optical modulator. The optical modulator includes at least one waveguide medium that receives light. An absorption medium absorbs or transmits the light under predefined conditions and outputs optically modulated light. The absorption medium is comprised of a Ge-based structure. The Ge-based structure uses the Franz-Keldysh effect to create the optically modulated light.

According to another aspect of the invention, there is provided a method of forming an optical modulator. The method includes providing at least one waveguide medium that receives light. The method also includes providing an absorption medium that absorbs the light under predefined conditions and outputs optically modulated light. The absorption medium is comprised of a Ge-based structure. The method further includes using the Franz-Keldysh effect to produce the optically modulated light in the Ge-based structure.

DETAILED DESCRIPTION OF THE INVENTION

The invention proposes a system and method of modulating light in Ge, SiGe, SiGeC, or other Ge-based materials utilizing the FK effect. This technique can be used to modulate 1.55 μm light, but can also be used to modulate a range of frequencies, depending on the composition of the SiGe or Ge. If the absorption coefficient of a material can be changed, this can be used to modulate light. Specifically, if the absorption coefficient of a particular wavelength can be changed, then this effect can be used to design and create a modulator for this wavelength.

As stated hereinbefore, Ge is an indirect semiconductor with a bandgap of approximately 0.68 eV; the direct transition lies at 0.8 eV. Ge is highly absorptive at 1.55 μm. Adding Si raises the direct transition energy, creating a material with relatively low absorption at 1.55 μm. Then, by applying an electric field, absorption can be increased. In this way, the FK effect can be used in SiGe to modulate 1.55 μm light. This same effect could also conceivably be used in the same materials system to modulate 1.3 μm light.

Figure 1A:
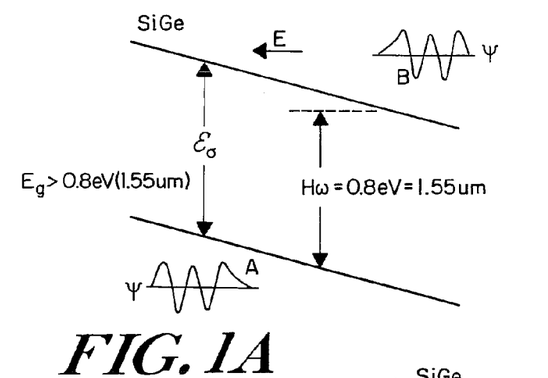
FIGS. 1A–1C are band diagrams demonstrating the improvements of the FK effect.
Figure 1B:
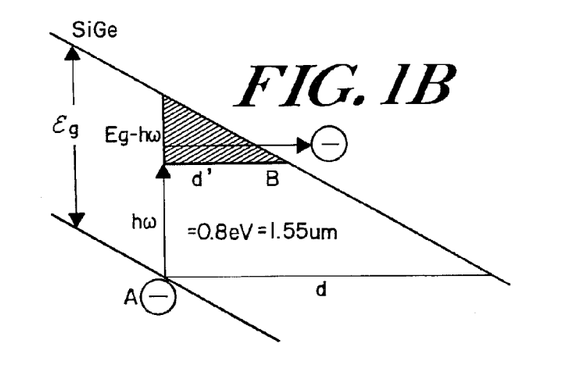

FIGS. 1A and 1B are band diagrams associated with using the FK effect in SiGe or Ge. By applying an electric field, this increases the absorption. Using the FK effect on SiGe, this can form a modulator to modulate light at 1.55 μm. The concentration of Si will determine the band structure of the material, which in turn affects wavelengths to be modulated. By varying the composition, it should be possible to construct modulators for a wide range of wavelengths.

FIG. 1A shows a band diagram associated with a SiGe or Ge structure where 1.55 μm light is not absorbed in absence of an electric field. The structure is not exposed to a high enough electric field to allow appreciable absorption. For valence electrons to reach the conduction band, it must tunnel through a triangular barrier height $\epsilon_g - h\omega$ and a thickness d, given by $d = (\epsilon_g - h\omega)/qE$. As E decreases, the barrier thickness, d, increases, reducing the tunneling probability and therefore reducing the absorption coefficient.

FIG. 1B shows an energy diagram associated with a SiGe or Ge structure where 1.55 μm light can be absorbed in the presence of an electric field. In this case, with the aid of an absorbed photon that has energy less then the band gap, it can be shown that the barrier height is reduced to $\epsilon_g - H\omega$ and the barrier thickness is reduce to $d' = (\epsilon_g - H\omega)/qE$. If the electric field is high enough, the barrier thickness is short and the valence electron can tunnel to the conduction band. The FK effect can be thought of as photon-assisted tunneling.

The E field can be provided to the SiGe or Ge structure using either a p-i-n diode or a MOS capacitor structure.

These are not the only possible structures for providing and electric field. Other structures for providing an electric field may also be conceived.

Figure 1C:
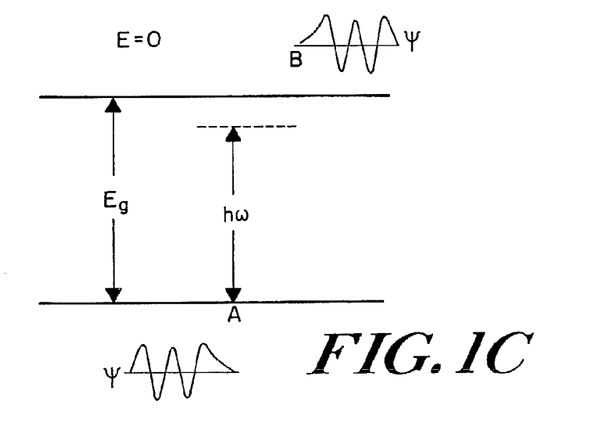

In the absence of an electric field, the above band diagram becomes flat and the barrier becomes infinite in width, as shown in FIG. 1C. Photons cannot be absorbed. The invention uses the FK effect to create a large change in the absorption coefficient near the direct transition, which is near the 1.55 µm light. Furthermore, by adding Si to a pure Ge structure, this increases the energy of the direct transition, thereby changing the wavelengths that can be modulated. Residual absorption from the indirect absorption would always be present in structures utilizing this effect.

For linear modulators a high change in the absorption coefficient is desirable to produce effective modulation in a short distance, and with the FK effect, the largest absolute change in absorption in a material can be achieved near the direct transition. The wavelengths modulated most effectively are those with energy near that of the direct transition.

In a linear modulator, a higher change in absorption coefficient will result in a shorter modulation length for a given modulation depth. If the change in absorption is smaller, a linear modulator with the same modulation depth will require a longer modulation length. There may be instances in which it is desirable for a linear modulator to have a small change in absorption coefficient and therefore corresponding longer modulating length. One example is in controlling optical chirp in the modulator.

This invention focuses on absorption changes near both the direct and indirect transitions, corresponding to large and small changes in the absorption coefficient, respectively.

It is possible to design a modulator, which operates using only a small change in the absorption. This allows light to be modulated using the FK effect in indirect absorption, where absorption is relatively weak.

In Ge or SiGe, absorption of light is weak near the band edge because phonons must be involved in the absorption process. However, a change in absorption can be achieved using the FK effect. By incorporating this small change in absorption in the proper structure, an effective modulator can be created.

There are three possible structures where a very small change in absorption coefficient can be used to modulate light. The first is in a resonant structure, which will be described more hereinafter. By increasing the absorption of the material by a small amount, the resonance of the structure can be destroyed. If designed properly, this can be used to modulate light. The second structure is a Mach-Zender (MZ) structure, which will be described more hereinafter. In this case, by changing the absorption in one arms of the MZ structure, the interference between the light in the two arms can be changed, allowing for modulation of the outputted light. The third is a linear absorption modulator, where the change in absorption coefficient is small. As has been described hereinbefore, a smaller change in the absorption coefficient results in an increased absorption length for a given modulation depth. There may be instances where this is desirable.

Also, the FK effect can be used with other material systems, such as InGaAs, to modulate 1.55 µm light. As with SiGe, by adjusting the composition, the band structure can be tailored to enable modulation of a range of wavelengths. The FK effect has been utilized in InGaAs systems to make modulators.

Moreover, the optical modulators using the inventive techniques can be used to create optical switches, thus making this technology applicable to other optical technologies.

Figure 2A:
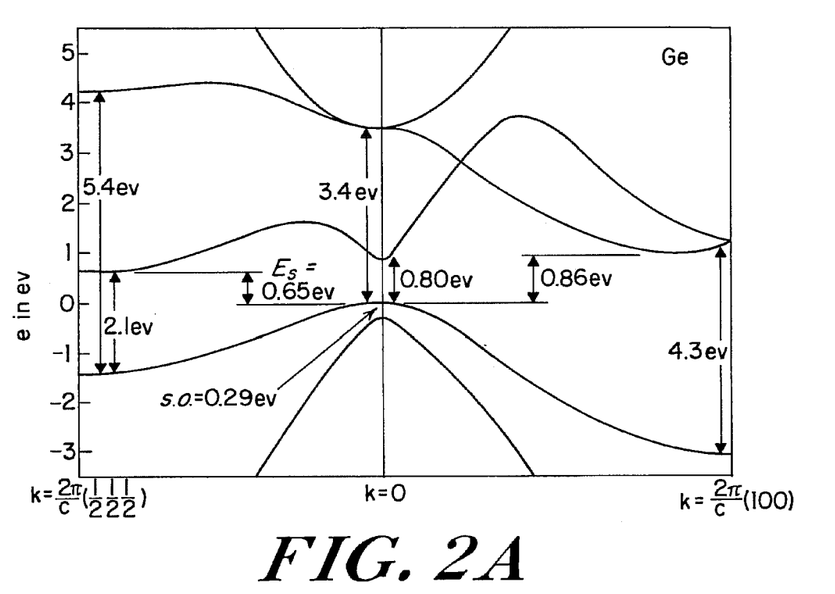
FIGS. 2A–2B are band structures for germanium and silicon.
Figure 2B:
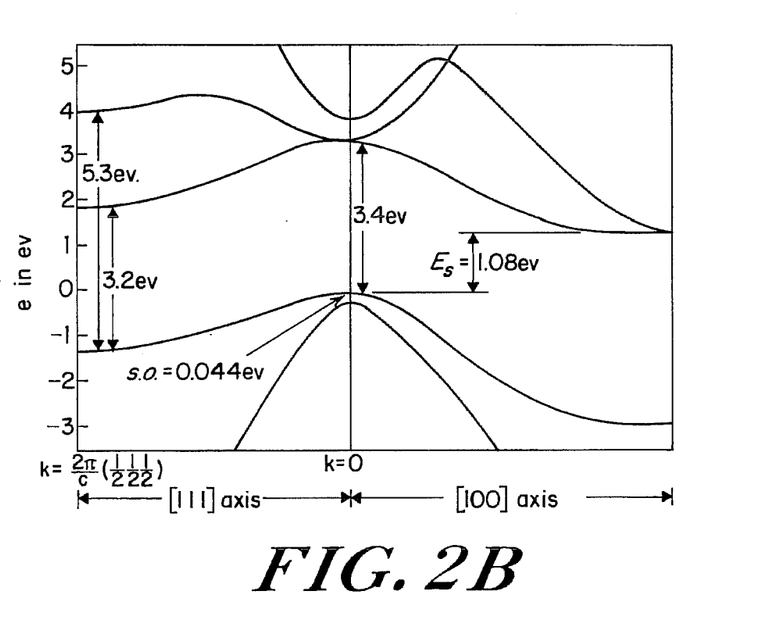

FIGS. 2A–2B are band structures for germanium and silicon. The invention applies the FK effect to materials system compatible with Si processing. The FK effect has been used to create electro-optic modulators in III-V compounds. However, no successful devices have been created in Si-compatible systems. One reason for this is that both Si and Ge have indirect band gaps. The FK effect is very weak near the band edge because of the indirect band gaps.

Another reason that the FK effect has not been used to modulate light in Si and Ge is that their band gap energies are not near the energies of wavelengths of interest in optical communications. However, the direct transition energy of Ge is actually slightly smaller than the energy of 1.55 µm light, which makes it highly absorptive at this wavelength. Because the FK effect increases absorption, and the absorption coefficient of Ge is already high for 1.55 µm light, Ge has not been used in FK modulators.

The band structure of Si and Ge are described in more detail hereinafter.

FIG. 2A illustrates the band structure of germanium (Ge). The spin orbit splitting (s.o.) of the valence band at k=0 is shown. The band structure is spaced between k=$2\pi/\alpha$(1/2, 1/2,1/2) and k=$2\pi/\alpha$(100). Also from FIG. 2A, the bandgap for Ge is approximately 0.66 eV, and the direct transition is at 0.8 eV. There is a corresponding abrupt increase in the absorption coefficient at this energy. Thus, for energies greater than 0.8 eV, Ge behaves as a direct semiconductor. This can be seen in FIG. 3 by the abrupt increase in absorption for wavelengths less than 1.5 µm, corresponding to energies less than 0.8 eV for Ge, which is the direct transition energy.

Figure 3:
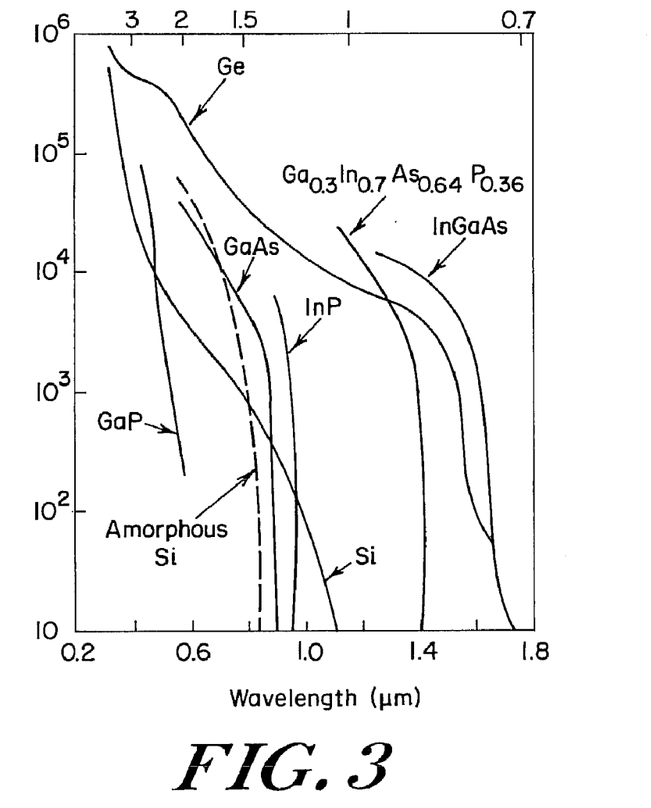
FIG. 3 is an absorption spectrum of several semiconductors.

FIG. 2B illustrates the band structure of silicon (Si) near the band gap. The spin orbit splitting (s.o.) of the valence band at k=0 is shown. The band structure is spaced between k=$2\pi/\alpha$(1/2,1/2,1/2) and k=$2\pi/\alpha$(100). Also from FIG. 2B, the bandgap of Si is at 1.08 eV, and the direct transition is at 3.4 eV. In FIG. 3, it demonstrates a corresponding abrupt increase in the absorption coefficient at this energy corresponding to wavelengths shorter than 365 nm. Thus, for energies greater than 3.4 eV, Si also behaves as a direct semiconductor.

FIG. 3 is an absorption spectrum of several semiconductors. In particular, FIG. 3 illustrates the absorption spectrum for semiconductors, such as Ge, GaAs, InP, GaP, Si, InGaAs, and $Ga_{0.3}In_{0.7}As_{0.64}P_{0.36}$. The bandgaps for GaP, GaAs, and InP are less than 1 µm, and the bandgap for Si is approximately between 1.0 µm and 1.2 µm. Moreover, the bandgap for $Ga_{0.3}In_{0.7}As_{0.64}P_{0.36}$ is approximately 1.4 µm, and for InGaAs is approximately 1.7 µm. Furthermore, the bandgap for Ge is approximately greater than 1.8 µm.

It can be seen that the absorption coefficient of a direct gap semiconductor increases very rapidly above the bandgap energy to a value of approximately $10^4$/cm. Changing the effective bandgap by means of the FK effect allows for large changes in the absorption coefficient near the band energy for direct gap semiconductors. For indirect materials, such as Si, the absorption coefficient increases quadratically with energy above the band gap energy. The increase as a function of wavelength is much smaller than for direct gap semiconductors. A small shift in the effective band gap in an indirect semiconductor would not result in a very large change in the absorption coefficient at this energy, as compared to a direct gap semiconductor.

The invention proposes to modulate light absorption in Ge and SiGe using the FK effect near the direct transition. From FIG. 2A, the direct transition is at 0.8 eV. There is a corresponding abrupt increase in the absorption coefficient at this energy. Thus, for energies greater than 0.8 eV, Ge behaves as a direct semiconductor, as previously described.

Furthermore, the invention allows the modification of the direct transition energy by creating a SiGe alloy. By choosing the correct composition, a material can be created in which the bandgap is slightly higher in energy than the light to be modulated. Then, by application of an electric field, the light can be selectively absorbed or transmitted through the device.

Figure 4A:
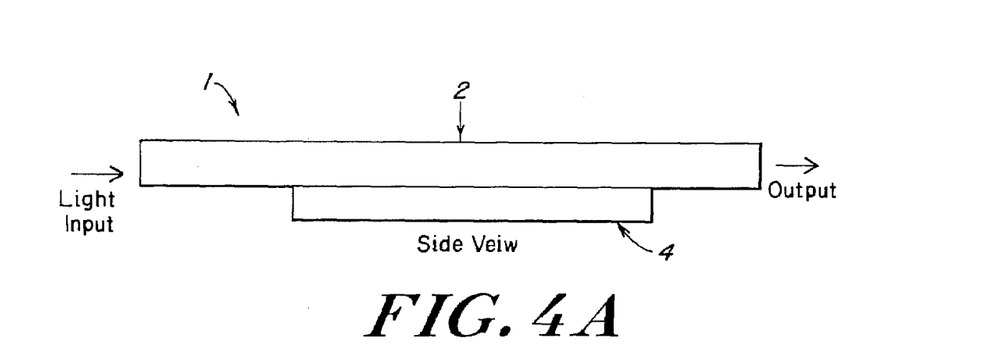
FIGS. 4A–4B are schematic diagrams of a linear waveguide modulator.
Figure 4B:
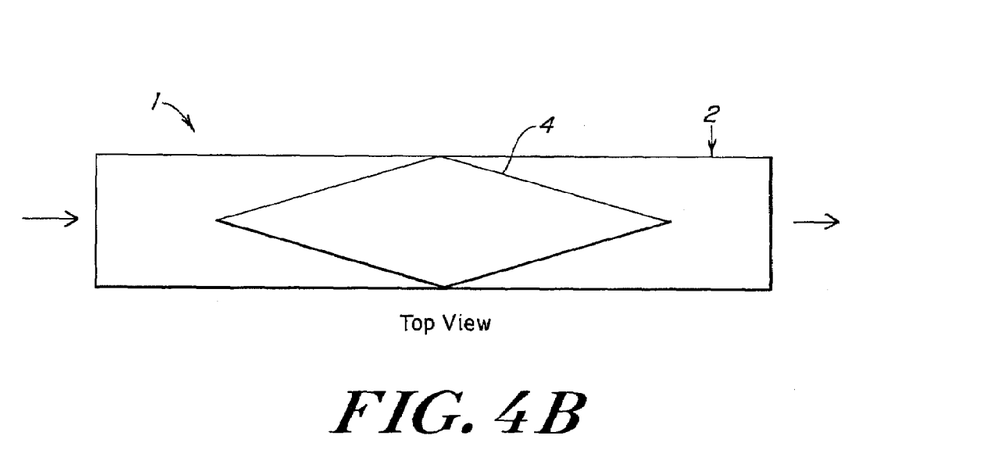

FIGS. 4A–4B are schematic diagrams of a linear waveguide modulator. FIG. 4A illustrates a side view of the linear waveguide modulator 1. The linear waveguide modulator 1 includes a linear waveguide 2 that is coupled into a SiGe waveguide 4. The SiGe waveguide 4 forms a variable absorption region for modulation of light received by the linear waveguide modulator 1. The SiGe waveguide 4 uses the FK effect to modulate light. The waveguide 4 can also be constructed using other Ge-based structures, which can use the FK effect for modulating light.

FIG. 4B is a top view of the linear waveguide modulator 1. The SiGe waveguide 4 has a patterned shaped to specifically absorb light of a specify wavelength. Other patterned shapes can be used to accomplish the same task. The change in the absorption coefficient of a particular wavelength of SiGe provides the flexibility to design and create the SiGe waveguide 4, thus forming the linear waveguide modulator for this wavelength.

In the off state, the light passes into the SiGe waveguide 4, and then back out to the linear waveguide 2. In the on state, the SiGe waveguide 4 absorbs the vast majority of the light to the output, via the linear waveguide 2. The patterned shape of the SiGe waveguide 4 determines the amount of time that light can be absorbed of a specified wavelength.

Figure 5A:
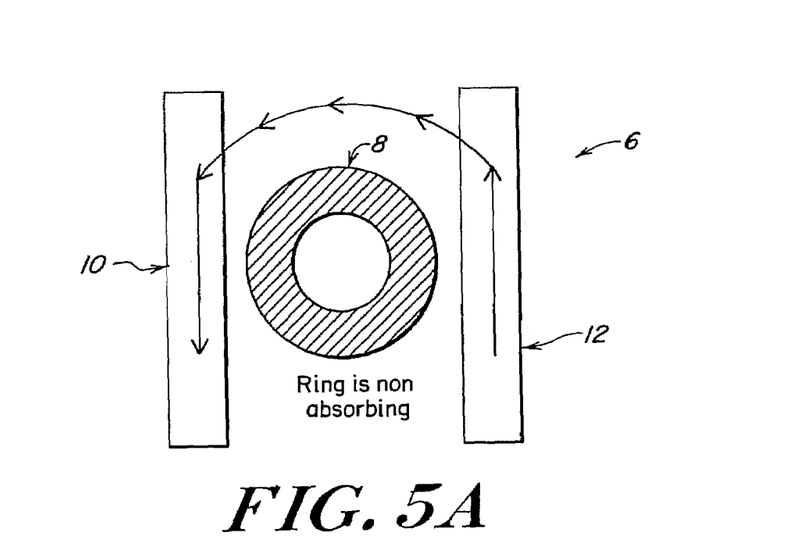
FIGS. 5A–5B are schematic diagrams of a ring resonator waveguide.
Figure 5B:
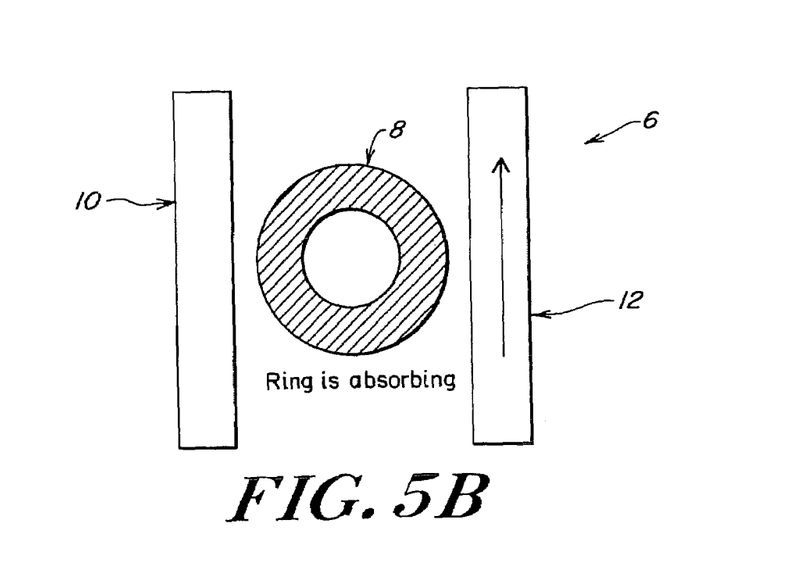

FIGS. 5A–5B are schematic diagrams of a ring resonator waveguide. A ring resonator waveguide 6, as shown in FIGS. 5A and 5B, includes a ring resonator 8 that can be turned on and off to couple light into one of two waveguides 10 and 12.

FIG. 5A demonstrates the ring resonator waveguide 6 in an off state. In this state, the ring 8 is non-absorbing and light is coupled into the waveguide 10. FIG. 5B demonstrates an on state of the ring resonator waveguide 6. In this arrangement, the ring 8 absorbs the light, preventing the resonant build up of light in the ring 8. As a consequence, light is not coupled into waveguide 10 and continues traveling in the waveguide 12, as shown by the direction of the light in the waveguide 12. This device can be used as either an optical modulator or an optical switch.

Since a relatively small amount of absorption will kill the resonance in the ring 8, the composition for the ring 8 will have a Si content such that only a small amount of absorption will be induced by the FK effect. Light is modulated near the indirect band edge, turning on and off the indirect absorption in the material. Another alternative is to have a thin SiGe layer either above or below the non-absorbing ring 8. Only a small part of the mode will travel in the SiGe thin layer, and by modulating the absorption of this thin layer, the resonance of the structure will be affected.

Figure 6:
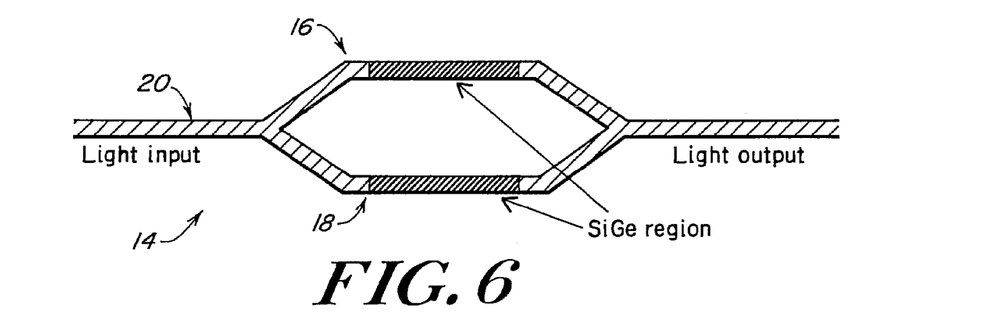
FIG. 6 is a schematic diagram of a Mach-Zehnder modulator structure.

FIG. 6 is a schematic diagram of a Mach Zehnder (MZ) structure 14. This structure can be used to modulate light by changing the phase of the light in one or both arms 16 and 18 of the MZ structure 14. Light is inputted into the structure 14 by means of a waveguide 20, and is then divided evenly between the two arms 16 and 18 of the MZ structure 14. If the light from the two arms 16 and 18 are in phase with each other, light will be outputted from the structure 14. If the light from the two arms 16 and 18 are out of phase with each other, the light will destructively interfere, and no light will be outputted.

By constructing the waveguide regions in one or both arms 16 and 18 of the MZ structure 14 out of SiGe, the absorption coefficient of the structure can be modified by means of the FK effect. Because a change in the absorption coefficient will also cause a change in the phase of the light outputted from the structure 14, this can be used effectively to modulate light as described above. To induce a phase change, only a small change in the absorption is needed. The arms 16 and 18 can also be constructed using other Ge-based materials that are operable using the FK effect for optical modulation.

Because only a small change in absorption is needed, the composition of the waveguide region in the MZ arms 16 and 18 will have a SiGe content such that only a small amount of absorption will be induced by the FK effect.

Figure 7A:
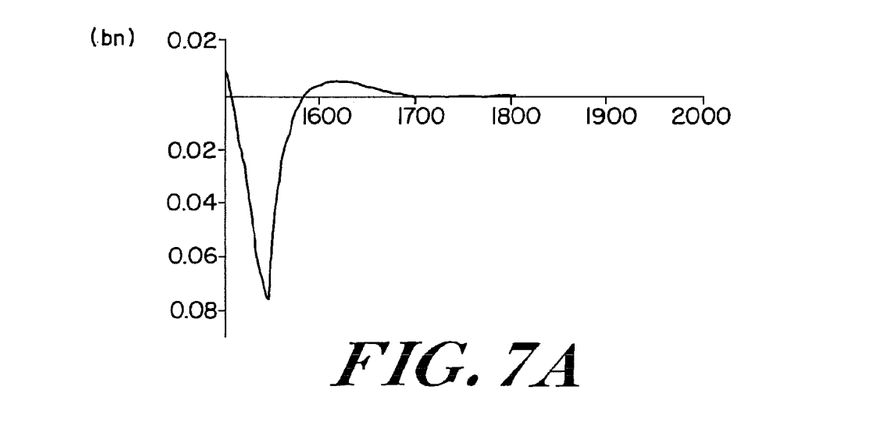
FIGS. 7A–7C are graphs illustrating the absorption properties of a pure Ge structure using the FK effect.
Figure 7B:
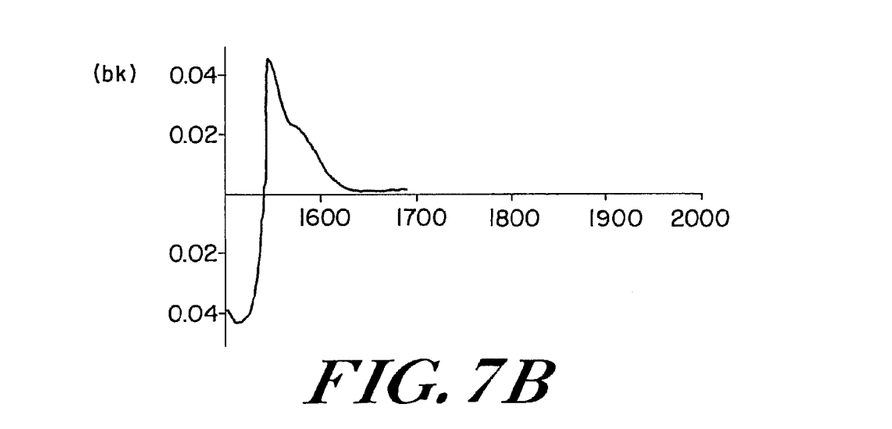
Figure 7C:
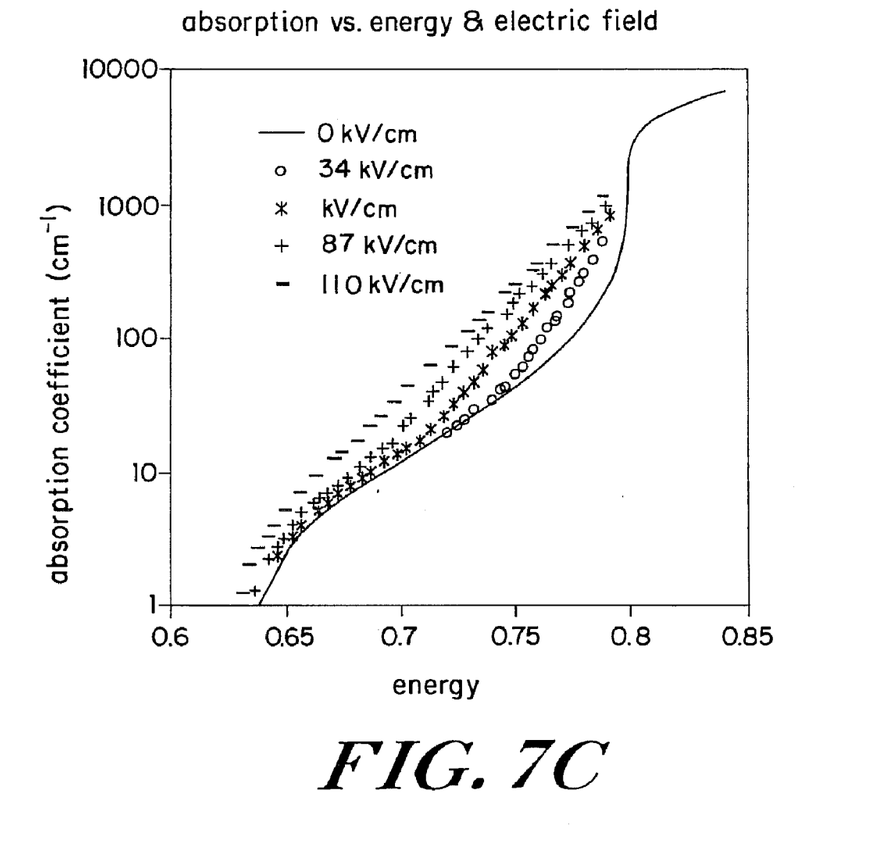

FIG. 7A–7C are graphs illustrating the absorption properties of a pure Ge structure using the FK effect. When a change in the absorption coefficient is introduced a change in the index of refraction also occurs. In the case of the MZ structure 14 described above, the change in the refractive index changes the phase of the light, allowing constructive or destructive interference between the light from the two arms 16 and 18 of the modulator 14. The constructive and destructive interference results in the modulation of the light. Thus, the FK effect not only affects the absorption coefficient, but also affects other properties, such as the index of refraction. The FK effect can be used to create a modulator by modifying these properties as well.

FIG. 7A is a graph illustrating the change in the index of refraction as a function of wavelength for an electric field of 100 kV/cm in pure Ge. As the wavelength is increased above 1580 nm, the index of refraction is also increased.

The k-value of an electric field can be a function of wavelength for an electric field, and is related to the absorption coefficient α, by the relation $k=\alpha\lambda/(4\pi)$. FIG. 7B is a graph illustrating the changes of the k-value as a function of wavelength for an electric field of 100 kV/cm in pure Ge. Furthermore, FIG. 7C is a graph illustrating the change of absorption coefficient as a function of the electric field and energy in pure Ge. These graphs illustrate the various factors that can change the absorption of a particular structure, such as pure Ge.

Figure 8A:
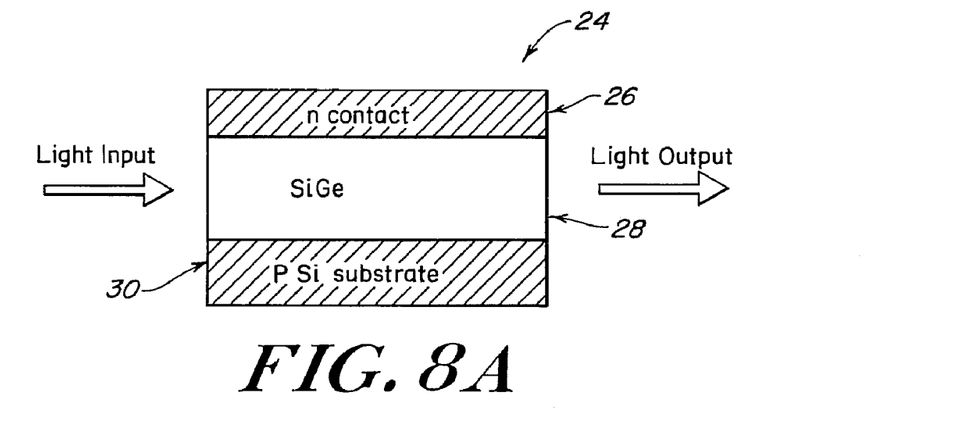
FIGS. 8A–8B are schematics of two structures that can be used to generate an electric field in SiGe electro-optic modulators.
Figure 8B:
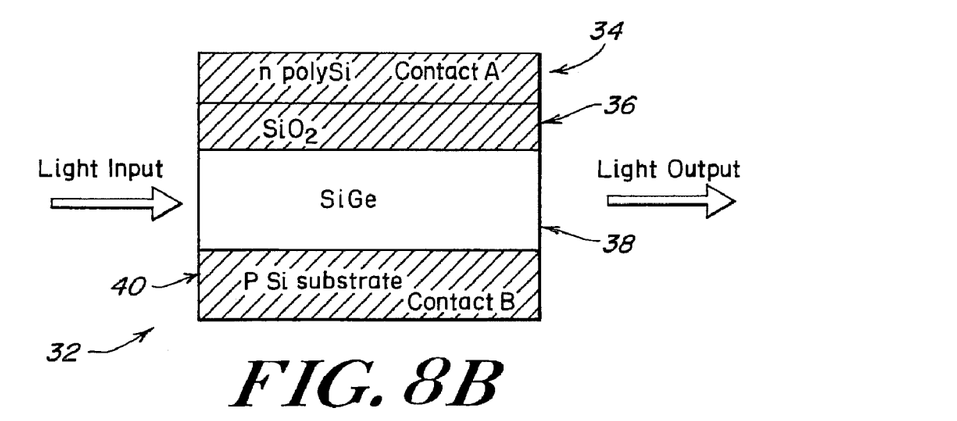

FIGS. 8A–8B are schematics of two structures 24 AND 32 that can be used to generate an electric field in SiGe electro-optic modulators. The first is a p-i-n structure 24 of FIG. 8A, and the second is a MOS structure 32 of FIG. 8B. Both of these structures 24 and 32 are widely used in current semiconductor processing. Other possible structures can be used to apply an electric field in an electro-optic modulator to utilize the FK effect.

The SiGe p-i-n structure 24 depicted in FIG. 8A is one possible embodiment of such a structure, and includes an n contact 26, p contact 30, and a layer of SiGe 28. This is not the only way in which such a structure can be made with SiGe. For example, the n 26 and p 30 contacts can be reversed. In this embodiment, the SiGe layer 28 is epitaxially grown on top of a p-doped Si substrate 30. On top of the SiGe layer, the n-doped poly Si 26 is deposited. Many methods could be used to make such a device, and other materials can be incorporated or substituted as well.

Furthermore, the structure 24 has a built in electric field. By applying an electrical bias to the structure, the electric field is changed, thus changing the electro-optic properties of the SiGe region 28 by means of the FK effect. In this embodiment the p-i-n structure 24 forms part of a waveguiding region for the light, with light entering on the left and exiting on the right. This structure 24 can be a part of an electro-optic modulator structure, as those described herein.

The SiGe MOS structure 32 depicted in FIG. 8B is another possible embodiment for providing electric fields, and includes an n contact A that is comprised of n-poly materials, a SiO2 layer 36, a SiGe layer 38, and a contact B that is comprised of a P-silicon substrate. Other possible arrangements can be used to form the SiGe MOS structure 32, for example, an insulating material other than $SiO_2$ can be used as the insulating layer or an n doped Si substrate can also be used.

In this embodiment, the SiGe layer 38 is epitaxially grown on top of a p-doped Si substrate 40. On top of the SiGe layer 38, a layer 36 of insulating SiO2 is grown. A layer 34 of n-doped poly Si is grown on the $SiO_2$ layer. Several methods are available for depositing the top two layers 36 and 38. Deposition processes must be chosen that will result in high quality layers and interfaces between layers in order that the device function properly.

By applying a voltage between the two contacts A and B, an electric field can be introduced in the SiGe region 38. Adjusting the voltage can control the magnitude of the electric field. In this way, the electro-optic properties of the SiGe region 38 can be changed by means of the FK effect. Also, the SiGe MOS structure 32 forms part of a waveguiding region for light, with light entering on the left and exiting on the right. This structure 32 can be part of an electro-optic modulator structure, as those described herein.

Although the present invention has been shown and described with respect to several preferred embodiments thereof, various changes, omissions and additions to the form and detail thereof, may be made therein, without departing from the spirit and scope of the invention.

What is claimed is:

1. An optical modulator comprising:
   at least one waveguide medium that receives light; and
   an absorption medium that absorbs said light under predefined conditions and outputs optically modulated light, said absorption medium is comprised of a SiGe or pure Ge structure;
   a MOS structure or p-i-n structure that provides an electric field to said absorption medium, said MOS structure comprising a layer of SiGe; wherein
   said absorption medium uses said electric field to induce the Franz-Keldysh effect to significantly change the absorption of said absorption medium so as to allow said light to be optically modulated in said absorption medium.

2. The optical modulator of claim 1, wherein said wavelength is 1.55 µm or 1.3 um.

3. The optical modulator of claim 1, wherein said at least one waveguide medium comprises a linear waveguide structure.

4. The optical modulator of claim 1, wherein said absorption medium comprises a patterned SiGe waveguide using said Franz-Keldysh effect.

5. The optical modulator of claim 1, wherein said at least one waveguide structure comprises two waveguides.

6. The optical modulator of claim 5, wherein said absorption medium is a ring resonator structure.

7. The optical modulator of claim 1, wherein said absorption medium is in one or both arms of a Mach-Zender structure.

8. The optical modulator of claim 1, wherein said predefined condition comprises an off state, where said light is not absorbed by said absorption medium.

9. The optical modulator of claim 8, wherein said predefined condition comprises an on state, where said light is absorbed by said absorption medium.

10. A method of forming an optical modulator comprising:
    providing at least one waveguide medium that receives light;
    providing an absorption medium that absorbs said light under predefined conditions and outputs optically modulated light, said absorption medium is comprised of a SiGe or pure Ge structure,
    forming a MOS or a p-i-n structure that provides an electric field to said absorption medium, said MOS structure comprising a layer of SiGe; and
    using said electric field to induce the Franz-Keldysh effect to significantly change the absorption of said absorption medium so as to allow said light to be optically modulated in said absorption medium.

11. The method of claim 10, wherein said wavelength is 1.55 µm or 1.3 um.

12. The method of claim 10, wherein said at least one waveguide medium comprises a linear waveguide structure.

13. The method of claim 10, wherein said absorption medium comprises a patterned SiGe waveguide using said Franz-Keldysh effect.

14. The method of claim 10, wherein said at least one waveguide structure comprises two waveguides.

15. The method of claim 14, wherein said absorption medium is a ring resonator structure.

16. The method of claim 10, wherein said predefined condition comprises an off state, where said light is not absorbed by said absorption medium.

17. The method of claim 16, wherein said predefined condition comprises an on state, where said light is absorbed by said absorption medium.

18. The method of claim 10, wherein said absorption medium is in one or both arms of a Mach-Zender structure.

* * * * *